United States Patent [19]
Feldman

[11] Patent Number: 5,974,784
[45] Date of Patent: Nov. 2, 1999

[54] INSULATIVE SHIELD, PARTICULARLY FOR AUTOMOTIVE EXHAUST COMPONENTS

[75] Inventor: Rubin Feldman, Ladue, Mo.

[73] Assignee: Nu-Chem, Inc., Fenton, Mo.

[21] Appl. No.: 09/169,915

[22] Filed: Oct. 12, 1998

[51] Int. Cl.⁶ ........................................ F01N 3/00
[52] U.S. Cl. ........................ 60/272; 60/299; 60/300; 60/322; 165/185; 442/65
[58] Field of Search .................... 60/323, 322, 299, 60/300, 272; 442/99, 65; 165/185

[56] References Cited

U.S. PATENT DOCUMENTS

| | | | |
|---|---|---|---|
| 3,863,445 | 2/1975 | Heath | 60/299 |
| 4,168,610 | 9/1979 | Engquist | 60/322 |
| 4,251,928 | 2/1981 | Rotar et al. . | |
| 4,487,289 | 12/1984 | Kicinski et al. | 181/252 |
| 4,508,776 | 4/1985 | Smith . | |
| 4,617,072 | 10/1986 | Merz | 156/89 |
| 4,687,785 | 8/1987 | Parker et al. . | |
| 5,004,018 | 4/1991 | Bainbridge | 60/282 |
| 5,108,810 | 4/1992 | Williams . | |
| 5,157,893 | 10/1992 | Benson et al. . | |
| 5,163,289 | 11/1992 | Bainbridge . | |
| 5,166,480 | 11/1992 | Bottger et al. . | |
| 5,175,975 | 1/1993 | Benson et al. . | |
| 5,240,533 | 8/1993 | Bottger et al. . | |
| 5,360,500 | 11/1994 | Evans et al. . | |
| 5,385,790 | 1/1995 | Atkinson et al. . | |
| 5,387,455 | 2/1995 | Horsch . | |
| 5,390,494 | 2/1995 | Clegg . | |
| 5,419,127 | 5/1995 | Moore, III . | |
| 5,451,448 | 9/1995 | Sawko et al. . | |
| 5,477,676 | 12/1995 | Benson et al. . | |
| 5,480,697 | 1/1996 | Bottger et al. . | |
| 5,590,524 | 1/1997 | Moore, III . | |
| 5,603,297 | 2/1997 | Wolf et al. . | |
| 5,792,539 | 8/1998 | Hunter . | |

*Primary Examiner*—Edward K. Look
*Assistant Examiner*—Binh Tran
*Attorney, Agent, or Firm*—Polster, Lieder, Woodruff & Lucchesi

[57] ABSTRACT

A heat shield for an exhaust system of a vehicle includes a resinified spaced layer fabric having at least one inner layer, at least one outer layer, and at least one spacer between the inner layer or layers and the outer layer or layers to form one or more insulative spaces. The heat shield includes an emissivity reducing material. The insulative space is between about one and about eight millimeters thick, to reduce convective heat transfer.

30 Claims, 1 Drawing Sheet

INSULATIVE SHIELD, PARTICULARLY FOR AUTOMOTIVE EXHAUST COMPONENTS

BACKGROUND OF THE INVENTION

This invention relates to a thermal shield for protecting relatively high-temperature components. It is particularly, but not exclusively, related to a shield for the components of a vehicular internal combustion engine exhaust system.

A vehicle's exhaust system includes the engine's exhaust manifold, a catalytic converter, a muffler, and piping connecting the exhaust manifold to the converter, the converter to the muffler, and the muffler to ambient. For proper operation, the catalytic converter must reach a "light-off" temperature. The catalytic converter operates most effectively above the light-off temperature. Above some maximum operating temperature, however, the catalytic converter may be permanently damaged. The light-off temperature and the operating temperature range vary in accordance with the design of the system, particularly the catalytic converter design. The light-off temperature may typically be on the order of 300° to 400° C. (600° F. to 800° F.); the maximum operating temperature may range from about 600° to 1,200° C. (1,100° F. to 2,200° F.). Causing the converter to reach its operating temperature quickly, without causing it to overheat has been the subject of considerable effort, as reflected for example in Benson et al., U.S. Pat. No. 5,477,676, Moore, III, U.S. Pat. No. 5,419,127, Clegg, U.S. Pat. No. 5,390,494, and Bainbridge, U.S. Pat. No. 5,163,289, the disclosures of which are incorporated herein by reference. These systems involve insulating the piping, the catalytic converter, or other exhaust system components, or heating the catalytic converter with an outside heat source.

The necessarily high temperature of the exhaust system, particularly the exhaust manifold, catalytic converter, and muffler, also creates problems with heat transfer to other components of the vehicle, including under-hood components, the passenger compartment, and rear components such as the trunk and fuel tank. This problem is particularly acute when certain components, such as the fuel tank and the trunk, are formed of plastic materials like polypropylene. Shielding these components from the heat of the catalytic converter is therefore of great importance. Examples of shields developed to protect against damage caused by the high temperature components of a vehicle exhaust system include Atkinson et al., U.S. Pat. No. 5,385,790, and Moore, III, U.S. Pat. No. 5,590,524, the disclosures of which are incorporated herein by reference.

A shield for the components of an exhaust system must meet several criteria. It must be sufficiently efficient to provide adequate thermal shielding. It must withstand repeated exposure to high temperatures. It must be strong enough to resist damage from rocks and the like. It must not rattle or produce other noise during operation of the vehicle. It must accommodate differential thermal expansion of its hot inner part and its cooler outer part. It must be compact. Preferably, it should be lightweight, recyclable, and inexpensive to make, install, and maintain. Also preferably, it should promote rapid achievement of the catalytic converter's light off condition but should not allow, or at least should not exacerbate, overheating of the components of the exhaust system. At present, no shield meets these criteria adequately.

BRIEF SUMMARY OF THE INVENTION

One of the objects of the present invention is to provide a shielding system for components of a vehicle's exhaust system which meets some or all of the foregoing criteria. Other objects will become apparent to those skilled in the art in light of the following disclosure.

In accordance with one aspect of this invention, generally stated, a shielding system for components of a vehicle exhaust system is provided which includes a first layer, a second layer, and a spacer between the first and second layers, the spacer holding the second layer a distance of about one to about eight milliliters from the first layer, the spacer holding the outer layer a distance of about one to about eight millimeters from the inner layer, the space between the first layer and the second layer being substantially filled with a gas. The distance between the first and second layers of the preferred shield is maintained small enough to inhibit or prevent convective transfer of heat. The shield thus permits substantially only radiative thermal conduction and greatly slows the flow of heat away from the exhaust manifold, catalytic converter or muffler. The shield may maintain a temperature differential up to several hundred degrees Celsius, typically two hundred to eight hundred degrees Celsius under operating conditions.

Additional layers and spacers may be provided and in some applications preferably are provided. Preferably the gas is air at substantially ambient pressure. Also preferably, the spacer is in the form of a corrugated member attached to at least one of the first layer and the second layer. Also preferably, the corrugations run axially (lengthwise) of the exhaust system. At least one of the first layer, the second layer, and the spacer is preferably formed of or with a low emissivity material.

In accordance with another aspect of the invention, the shield is a spaced layer fabric. Such materials are well known and are sometimes called three dimensional fabrics, truss core structures, or sandwich panels. Examples are found in Hörsch, U.S. Pat. No. 5,387,455, Sawko et al., U.S. Pat. No. 5,451,448, Evans et al., U.S. Pat. No. 5,360,500, Williams, U.S. Pat. No. 5,108,810, Böttger et al., U.S. Pat. No. 5,480,697, Böttger et al., U.S. Pat. No. 5,240,533, and Böttger et al., U.S. Pat. No. 5,166,480, the disclosures of which are incorporated herein by reference. Such materials include two face layers of fabric connected by a core or web. The fabric is generally treated with a binder or resin as described hereinafter. The core or web is frequently woven or knitted into the face layers during the manufacturing process. In other manufacturing processes, the core is formed separately and is adhered or sewn to the face layers. The core may be in the form of corrugations which form triangular prisms with the face layers, or it may be formed of cylinders, hexagonal prisms, or other geometries, preferably of a generally elongate prismatic or cylindrical form.

The fabric portion of the shield is preferably formed of a high temperature fiber, such as a graphite fiber or a high-temperature fiberglass fiber, although other fibers are believed to be usable.

The resin is chosen to resist the highest expected operating temperature of the exhaust system. As used herein, the term "resin" is used broadly to include any suitable material which can coat the fabric as a liquid and which is sufficiently hardenable to form a self-supporting structure. Such resins are well known and include, for example, silicates, imide resins such as those disclosed in Parker, U.S. Pat. No. 4,687,785, and other high-temperature resins. The resin may be applied in any known manner, such as rolling, brushing, or spraying, but it is preferred that the resin be applied in a continuous dipping process which is well known, per se, in the art.

Low emissivity may be achieved by depositing a layer of metal, such as aluminum or titanium or a non-oxidizing noble metal like gold or platinum, on one or more of the layers of the shield or on the web, preferably before the three dimensional fabric is coated with resin. Suitable processes, such as chemical vapor deposition (CVD) or the vacuum deposition technique described in Smith, U.S. Pat. No. 4,508,776, for carrying out the metalizing are well known. Such a process permits precise control of the emissivity of the shield and of particular components of the shield. Alternatively, the resin may incorporate metal particles in a technique such as is described in Rotar et al., U.S. Pat. No. 4,251,928. Less desirably, a separate metal foil layer may be bonded to the shield.

It will be understood that although the shield is described hereinafter as a single resinified spaced layer fabric, it is anticipated that the structure will in many applications include multiple layers which may or may not share face layers. For example, a third face layer may be spaced by a second spacer from the outer facing layer, or a separate shield member of the invention may be applied over a first such member.

The shielding system preferably covers substantially only one or more of the components of the exhaust system and not the piping. Also preferably, the ends of the heat shield are open.

It is preferred that the heat shield of the present invention completely circumferentially surrounds the exhaust system component but does not cover its ends. In other embodiments, however, the shield covers only a part of the circumference of the component. The exhaust manifold, for example, is not cylindrical and can only be covered on one side. Other components may preferably not be covered completely, for purposes of controlling the internal temperature of the component or reducing the cost of the shielding by applying the shielding only to the side of the exhaust component facing another vehicle component.

It is presently preferred that the shield be a separate element which is mechanically mounted to the exhaust system component or is bonded to it. It is also anticipated, however, that the shield may in some cases form the outer skin of the component itself, or as in the case of piping, form the entire body of the component.

The shield of the present invention may also find use in other applications than protecting against heat from the exhaust system of a vehicular internal combustion engine.

DESCRIPTION OF THE PREFERRED EMBODIMENT(S)

Figure 1:
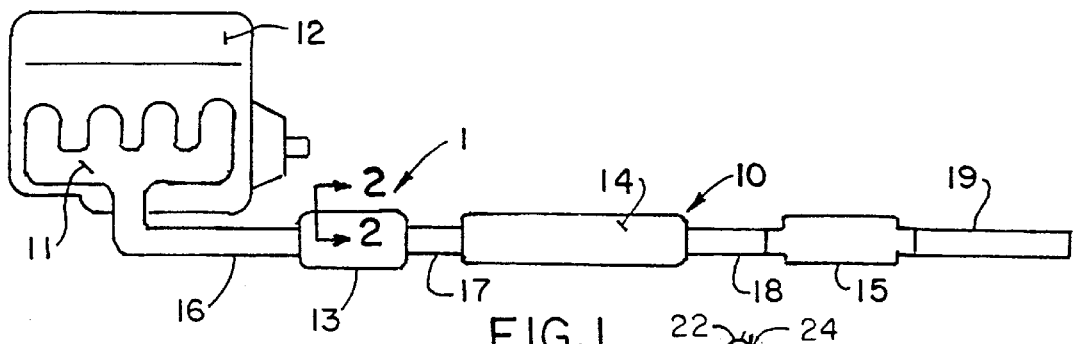
FIG. 1 is a diagrammatic view of an automobile exhaust system incorporating a heat shielding system of the present invention.

Referring now to the drawings and in particular to FIG. 1, reference numeral 1 indicates a heat shielding system of the present invention applied to an automotive exhaust system 10. The exhaust system comprises a manifold 11 attached to an internal combustion engine 12, a catalytic converter 13, a muffler 14, and a resonator 15. These components are connected to each other by exhaust pipes 16, 17, and 18, and the resonator 15 is connected to ambient at the rear of the vehicle by a tail pipe 19. A heat shielding system 1 of the present invention is applied around the catalytic converter 13. The heat shielding system 1 is shown in more detail in FIG. 2.

Figure 2:
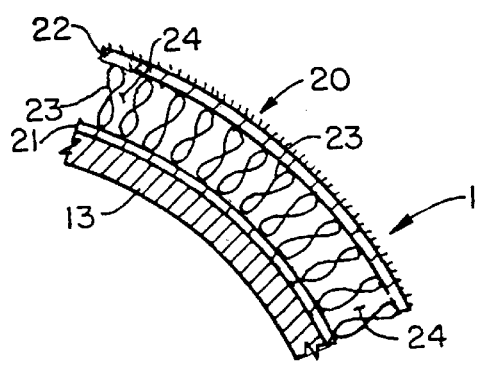
FIG. 2 is a detail of a portion of the shielding system of FIG. 1.

As shown in FIG. 2, the preferred heat shield of the present invention is formed of a high temperature graphite yarn formed into a spaced layer fabric 20 in a manner well known in the industry. A material formed in the same manner is sold by Vorwerk & Co. Mobelstoffwerke GmbH & Co. KG, Kulmbach, Germany, under the trademark TechnoTex. The spaced layer fabric 20 includes a first layer 21 and a second layer 22 connected to each other by a web 23 which forms longitudinally extending hexagonal prisms 24 in the insulative space between the first layer 21 and second layer 22. The web 23 separates the layers 21 and 22 by a distance of about five millimeters when the three dimensional fabric structure is extended.

The layers 21 and 22 are then metallized with a titanium coating by chemical vapor deposition to give the layers a desired increased reflectivity and decreased emissivity. In this embodiment, the emissivity is chosen to be about 0.1 to 0.2.

Figure 3:
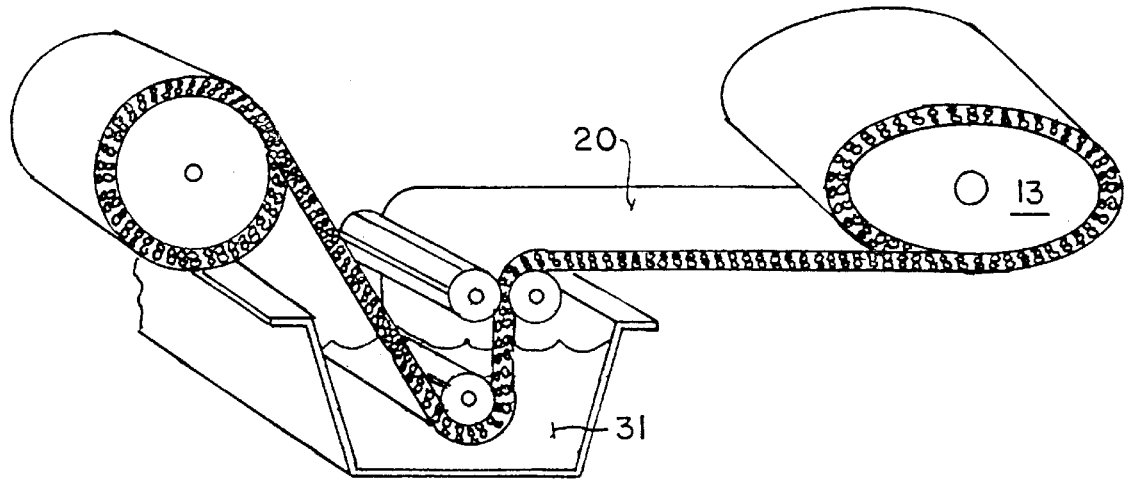
FIG. 3 is a schematic representation of a method of forming a catalytic converter protected by a heat shield of the present invention.

Are shown in FIG. 3 the metallized three dimensional fabric 20 is then run through a continuous dipping bath 31 in the form of an aqueous silicate solution. The silicate solution coats the fabric 20, including the metallized layers 21 and 22 and the web 23. The coated, uncured, shield 1 is then wrapped around the catalytic converter 13 with the prisms 24 running lengthwise of the converter 13, and the outer layer 22 is expanded by known methods before the silicate is cured. When the silicate is cured, the shield 20 provides a resinified spaced layer fabric shield around the converter 13. The spacing between coated layers 21 and 22 is reduced by the silicate resin to about three millimeters. The silicate bonds the shield 1 to the converter 13. The bonding of the shield to the converter and its tight fit on the converter reduce vibration of the shield with respect to the converter. Differential thermal expansion of the converter 13 and the shield 1 is accommodated by a certain amount of elasticity in the cured silicate.

It is anticipated that the shield 1 will maintain a temperature below about 200° C. (400° F.) at its outer face even when the temperature at the surface of the catalytic converter 3 exceeds about 1,000° C. (1,800° F.).

Figure 4:
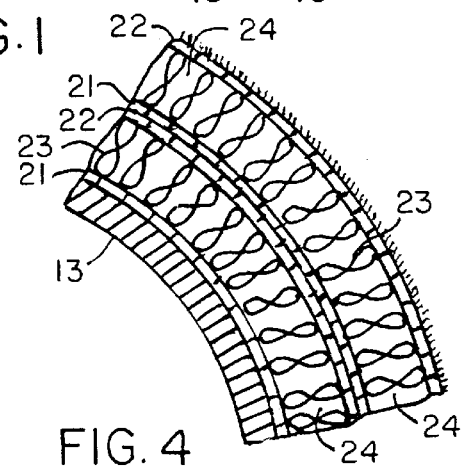
FIG. 4 is a detail corresponding to FIG. 2, showing a two-layer shielding system.

As shown in FIG. 4, an additional wrap of the spaced layer fabric 20 provides greater thermal insulation.

Numerous variations in the shield of the present invention, within the scope of the appended claims, will occur to those skilled in the art in light of the foregoing disclosure. Merely by way of example, the mounting means for the shield may be any known or convenient means for holding a conventional heat shield to a catalytic converter or muffler. The ends of the shield may be closed and the atmosphere within the shield may be controlled by the pressure and composition of the gas within the shield. The shield may be made of different materials, although high-temperature, high reflectivity materials are preferred for at least the inner member and spacer. The spacer may be made in different ways, for example as shown in Benson et al., U.S. Pat. Nos. 5,157,893 and 5,175,975, or Hunter, U.S. Pat. No. 5,792,539. The shield may be attached to the component to be protected as in Wolf et al., U.S. Pat. No. 5,603,297. The shield may be used in entirely different environments, such as a jet engine, a furnace, or other high temperature environments requiring shielding to reduce transfer of heat to nearby bodies. These variations are merely illustrative.

I claim:

1. A shielding system for components of a vehicle exhaust system, the system comprising a first layer and a second layer, and a space between the first and second layers, the spacer holding the second layer a distance of about one to about eight millimeters from the first layer to form an insulative space between the first layer and the second layer, the insulative space being substantially filled with a gas, and means for holding the system to a component of the exhaust system.

2. The shielding system of claim 1 wherein the gas is at generally atmospheric pressure when the vehicle is not in operation and the exhaust system has cooled to ambient.

3. The shielding system of claim 1 wherein the gas is air.

4. The shielding system of claim 3 wherein the insulative space is open to ambient, the gas being at generally atmospheric pressure when the vehicle is in operation.

5. The shielding system of claim 1 wherein the spacer is bonded to at least one of the first layer and second layer.

6. The shielding system of claim 5 wherein the spacer defines parallel prisms or cylinders in the insulative space, the prisms or cylinders running lengthwise of the exhaust system.

7. The shielding system of claim 1 wherein the first layer and the second layer, and the spacer are all formed of fabric.

8. The shielding system of claim 7 further comprising an emissivity modifier, the emissivity modifier reducing emissivity of the system to a selected value under selected conditions.

9. The shielding system of claim 1 wherein the system covers substantially the circumferential surface of at least one of the muffler and the catalytic converter of the exhaust system.

10. The shielding system of claim 9 wherein the heat shield completely circumferentially surrounds the exhaust system component but does not cover its ends.

11. The shielding system of claim 1 further comprising a third layer separated from the second layer by a distance of about one to about eight millimeters.

12. In a vehicle exhaust system having at least one component which in use reaches a temperature of at least 200° C., the improvement comprising a shield for the component, the shield comprising a plurality of reflective surfaces each separated from an adjacent such surface by a layer of air, the thickness of the layer of air being maintained sufficiently small to substantially inhibit convective currents within the layer of air, the layer of air communicating with ambient air to maintain pressure in the layer of air substantially at ambient pressure.

13. The improvement of claim 12 wherein the reflective surfaces are spaced apart a distance of from about one to about eight millimeters.

14. The improvement of claim 12 wherein the at least one component is selected from the group consisting of exhaust manifolds, catalytic converters, and mufflers.

15. The improvement of claim 12 wherein the air communicates with ambient air to maintain pressure in the layer of air substantially at ambient pressure.

16. In a vehicle exhaust system having at least one component which in use reaches a temperature of at least 200° C., the improvement comprising a shield for the component, the shield comprising a plurality of reflective surfaces each separated from an adjacent such surface by a layer of air, the thickness of the layer of air being maintained sufficiently small to substantially inhibit convective currents within the layer of air, the shield comprising a spaced layer fabric having an inner layer, and outer layer, and a spacer web between the inner layer and the outer layer.

17. The improvement of claim 16 wherein the fabric is coated with resin.

18. The improvement of claim 17 wherein the resin includes a material which increases reflectivity of the surface and reduces emissivity of the surface.

19. The improvement of claim 16 wherein layers of the fabric are coated with an emissivity reducing agent.

20. A component of a vehicle exhaust system, the component in use reaching an internal temperature of at least 200° C., the component comprising a shield for protecting other vehicular components from the heat of the exhaust system component, the shield comprising a spaced layer fabric having an inner layer, an outer layer, and a web separating the inner and outer layers.

21. The component of claim 20 wherein the shield includes an emissivity reducing component.

22. The component of claim 21 wherein the emissivity reducing component comprises a metallic coating on at least one of the inner layer and the outer layer.

23. The component of claim 20 wherein the shield comprises a resin coating at least one of the spaced layers.

24. A method of forming a component of a vehicle exhaust system comprising at least partially forming a body of the component, forming a spaced layer fabric having a first layer and a second layer attached by a web and a liquid resin applied to the fabric, at least partially wrapping the spaced layer fabric around the component body, and permitting the liquid resin to cure.

25. The method of claim 24 wherein the resin secures the fabric to the component body when it cures.

26. In a vehicle exhaust system having at least one component which in use reaches a temperature of at least 200° C., the improvement comprising a shield for the component, the shield comprising a first layer and a second layer, and a space between the first and the second layers, the spacer holding the second layer a distance of about one to about eight millimeters from the first layer to form an insulative space between the first layer and the second layer, the insulative space being substantially filled with a gas.

27. The improvement of claim 26 wherein the gas is at generally atmospheric pressure when the vehicle is not in operation and the exhaust system has cooled to ambient.

28. The combination of claim 26 wherein the insulative space is open to ambient, the gas being air at generally atmospheric pressure when the vehicle is in operation.

29. The combination of claim 26 wherein the spacer defines parallel prisms or cylinders in the insulative space, the prisms or cylinders running lengthwise of the exhaust system.

30. The combination of claim 26 wherein the first layer, the second layer, and the spacer are all formed of fabric, and further comprising an emissivity modifier, the emissivity modifier reducing emissivity of the shield to a selected value under selected conditions.

* * * * *